Figure 3:
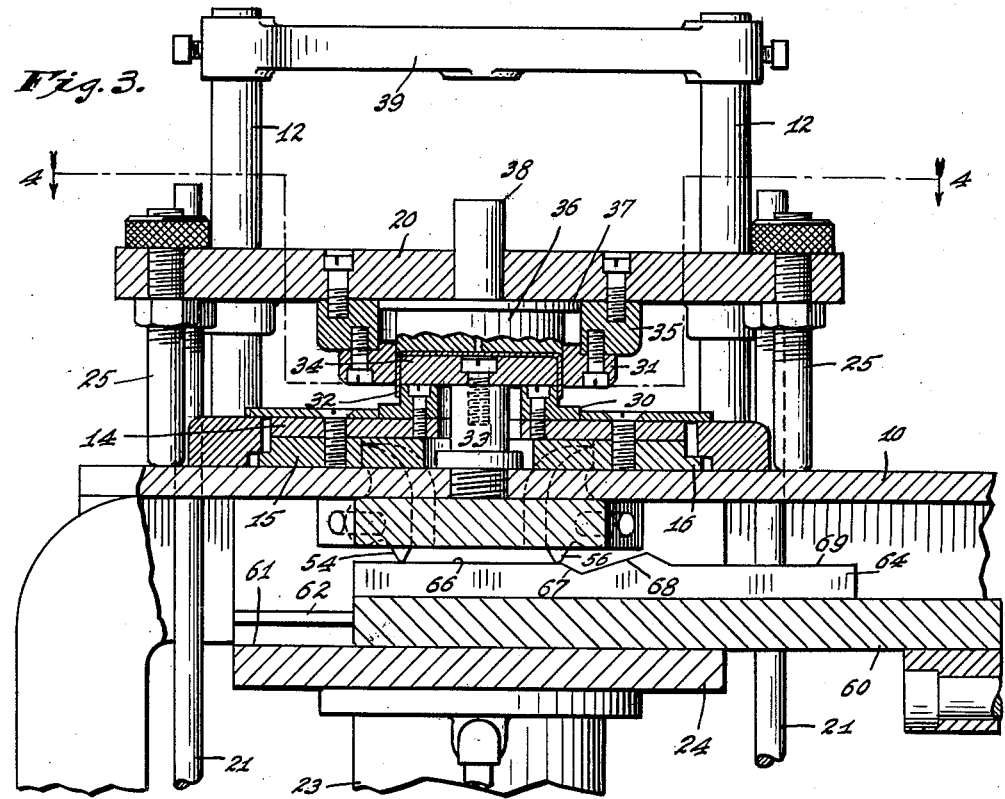

Sept. 12, 1950      W. O. HARTUP      2,521,975
SHEET METAL TRIMMING MACHINE
Filed Nov. 15, 1946      2 Sheets-Sheet 1
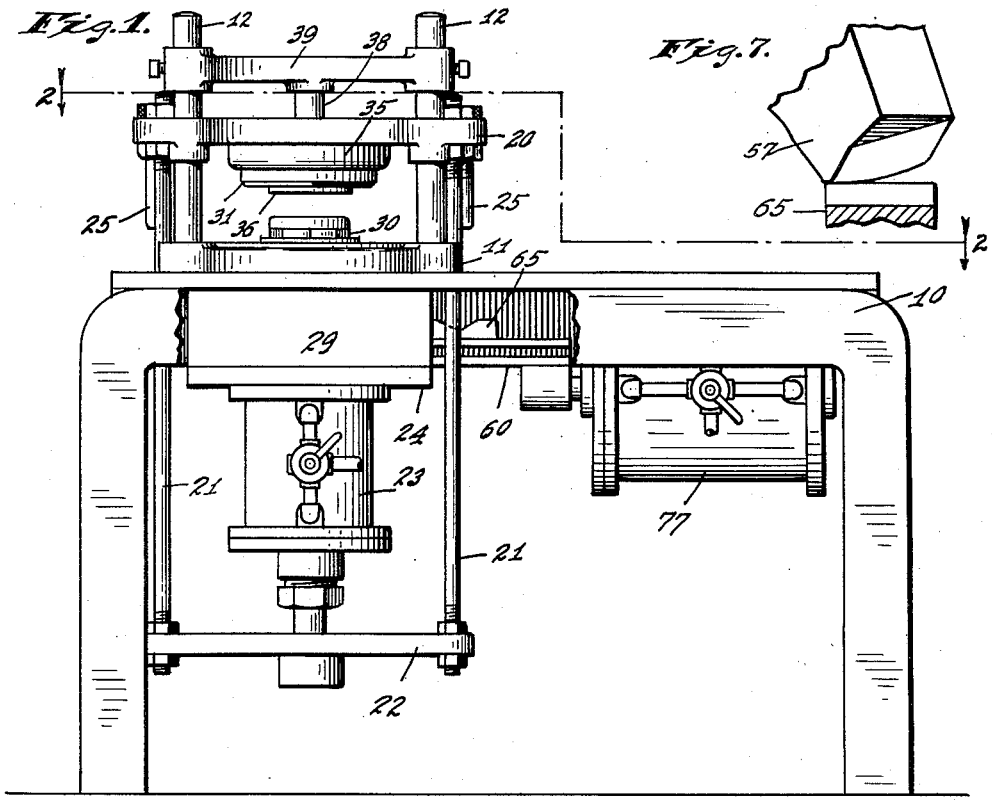
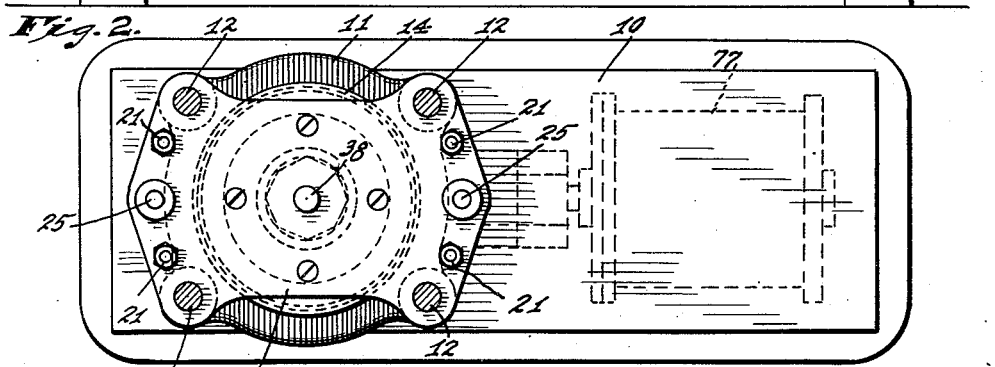
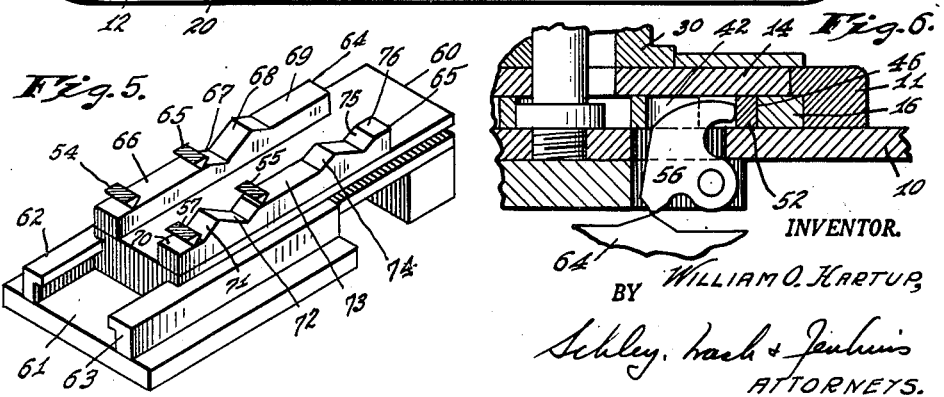
INVENTOR.
WILLIAM O. HARTUP,
BY Schley, Nash & Jenkins
ATTORNEYS.

Sept. 12, 1950 W. O. HARTUP 2,521,975
SHEET METAL TRIMMING MACHINE
Filed Nov. 15, 1946 2 Sheets-Sheet 2

INVENTOR.
William O. Hartup,
BY
ATTORNEYS

Patented Sept. 12, 1950

2,521,975

UNITED STATES PATENT OFFICE 2,521,975

SHEET METAL TRIMMING MACHINE

William O. Hartup, Columbus, Ind.

Application November 15, 1946, Serial No. 710,168

9 Claims. (Cl. 164—48)

This invention relates to a machine for operating upon sheet-metal stampings, especially for trimming the walls of drawn parts.

It is my general object to produce a machine for this purpose which will be self contained, simple in construction and operation, and efficient in performing its work.

Many sheet-metal parts, after being drawn or formed to their desired shape, then have their walls trimmed to provide edges of a desired contour, which may be a continuous edge in a flat or curved plane, or may include notches or upstanding tabs. Supplementary cutting and forming operations may also be done at or adjacent the trimmed edge, by providing the trimming dies with suitable parts for this purpose.

It is now common practice to do this work in a press, by means of a special die mechanism which carries a pair of trimming dies vertically past cams which cause relative horizontal movement between the dies. Such special mechanism is relatively expensive, and requires the time and use of a still more expensive press. The system is inherently inefficient, in that it utilizes an expensive press designed to work in a vertical direction, to perform an operation in which the requirements for vertical work are substantially only to hold parts in relative position, and in which the productive operations are performed by horizontal movement of parts. Moreover, in such a system, productive work can be done only during one stroke of the press, and an idle return stroke is unavoidable.

In providing a self contained machine it is in part my object to avoid the necessity of using the time of a highly expensive press. It is my further object to provide a machine which will be productive on each stroke, without an idle return stroke, which will lend itself to automatic feeding, which will effectively break the trim scrap to make it easily removable, which will require a minimum of power, and which will be sufficiently simple in construction that it will be not substantially more expensive than the special mechanism now used in the even more expensive presses.

In carrying out my invention, I mount a laterally movable die plate upon a table, mount one die of a pair of trimming dies on that plate, and provide the table with an upper-die holder which is independently movable to position a complementary die in working relationship with the die upon the plate and to raise that complementary die to provide clearance for loading and unloading the work on a work holder associated with the lower die. This portion of the structure is similar to that described and claimed in my copending application Serial No. 709,055, filed November 9, 1946.

In accordance with the invention of this application the die plate is mounted on an underlying thrust plate which is provided with inner vertical thrust-receiving faces perpendicular to radii of the die plate, and each of such thrust faces is engaged by a shoe which is in operative engagement with the toe of a bell-crank lever. The several bell-crank levers are pivotally mounted beneath the table and are operated by a cam movable beneath the table.

Preferably, there are four levers and shoes, and four thrust-receiving faces; the levers are arranged in pairs with the levers of each pair operable outwardly in diametrically opposite directions and with the two pairs on diameters perpendicular to each other; and the thrust-receiving faces are in corresponding pairs respectively positioned perpendicular to the thrust-lines of the four levers. The levers are desirably lifted by cam-bars slidable horizontally beneath them in a direction at an angle to the vertical planes of lever movement. Two cam-bars may be used, which may be on a single carrier, and each cam bar may operate two of the four levers.

The cam elements selectively raise and lower the levers to cause translation of the die plate first in opposite directions in line with one pair of levers and then in opposite directions in line with the other pair of levers. During each movement of each pair of levers, the other pair is held stationary so that its shoes bear against their associated thrust faces as guides to limit the motion of the die plate to linear motion in the direction of such thrust faces. The cam plate is movable by any suitable power means, conveniently a fluid-operated cylinder, and produces a productive motion of the die plate on each stroke.

Figure 4:
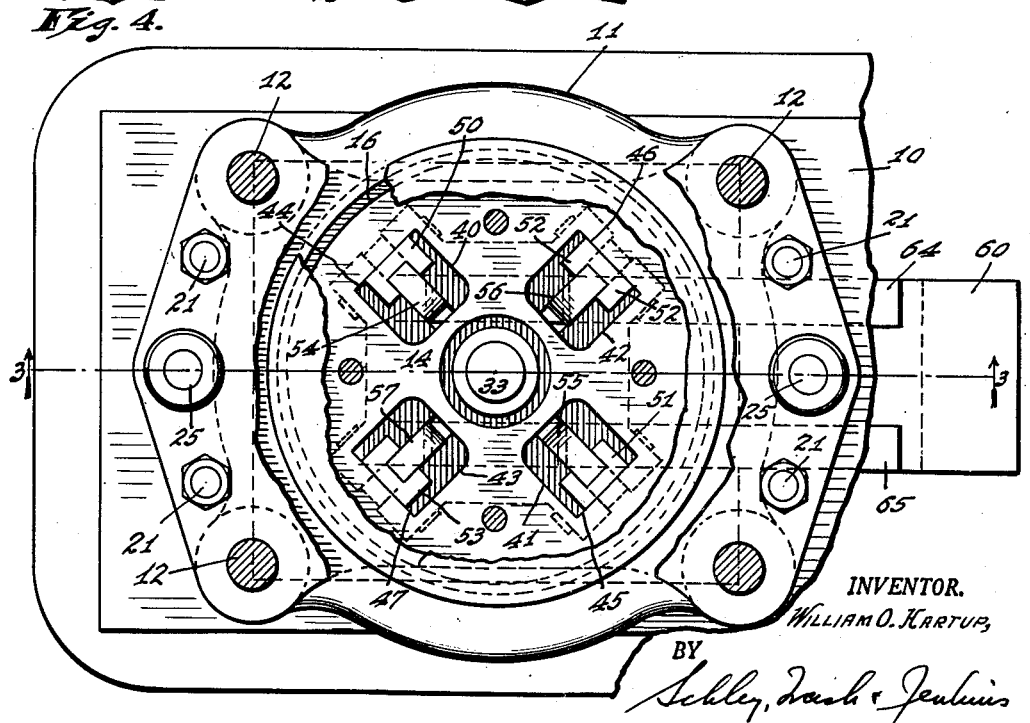

The accompanying drawings illustrate my invention. In such drawings, Fig. 1 is a front elevation of a machine embodying my invention; Fig. 2 is a plan of the machine shown in Fig. 1 on the line 2—2 of Fig. 1; Fig. 3 is a vertical section taken on the vertical axis of the dies; Fig. 4 is a horizontal section taken on the line 4—4 of Fig. 3, with parts broken away; Fig. 5 is an isometric view of the cam bars and carrier; Fig. 6 is a vertical section in the plane of one of the bell-crank levers; and Fig. 7 is a fragmental isometric view of the heel of one of the bell-crank levers.

The machine shown in the drawing comprises a table 10 upon which is mounted a frame 11 which supports four vertical guide posts 12 at its corners. A die plate 14 is mounted on the table 10 within the frame 11, by means of an underlying thrust plate 15, and the die plate and thrust plate assembly are held on the table by a flange 16 which projects beneath the inner edge of the frame 11. The die plate 14 is thus held in slidable relation on the table 10 and is permitted limited sliding motion thereover.

An upper die carrier 20 is mounted for vertical movement on the guide posts 12 and is connected by draw bars 21 to a lower cross head 22. A power cylinder 23 is connected between this lower cross head 22 and a frame member 24 so that operation of the power cylinder 23 will raise and lower the upper die carrier 20. Stop members 25 may be mounted on the carrier 20 to engage the upper face of the table 10, to limit downward movement of the carrier 20.

The inner die 30 of a pair of trimming dies is mounted on the die plate 14, and the outer die 31 is mounted on the carrier 20, so that the outer die 31 may be brought down over a work piece 32 into shearing relationship with the inner die 30, where sliding movement of the die plate 14 across the table 10 will cause the lower die 30 to trim the depending edges of the work piece 32.

The lower die 30 is mounted on the die plate 14 in any suitable manner, as by screws as shown. The die plate 14, the thrust plate 15, and the lower die 30 are all provided with aligned openings through which a lower work holder 34 is supported on the table 10. With the relatively small die shown, the openings are conveniently central, and the support comprises a single central post 33. The lower work-holder 34 is shaped to conform to the inside of the work piece 32, and may slidably engage the top surface of the lower die 30.

The upper die 31 is mounted on the carrier 20 by means of a supporting ring 35. The upper die 31 has a central opening which closely fits the outside of the work piece 32, and the supporting ring 35 has a similar opening, to receive an upper work holder 36. Conveniently, the opening in the ring 35 is somewhat larger than that in the die 31 so that the die 31 forms a shoulder within the opening. The work holder 36 is vertically movable within the die 31 and ring 35, and a collar 37 on the work holder 36 engages the shoulder formed by the die 31, to retain the holder 36.

The parts are so proportioned that as the two dies 30 and 31 are brought together, the holders 34 and 36 closely embrace the work piece 32 to hold it in proper position for trimming. After the trimming operation, and when the dies are separated, means is provided to force the upper work holder 36 downwardly with respect to the die 31, to eject the work piece 32 from that die 31. Conveniently, this is accomplished by providing a knock out bar 38 on top of the die holder 36, which projects upwardly beyond the carrier 20. A cross member 39 is positioned above the knock out bar 38 to stop the knock out bar during upward travel of the carrier 20, and thus hold the upper work holder 36 stationary during the latter part of the upward travel of the carrier 20.

In the trimming operation, the die plate 14 is moved successively in a sequence of short strokes in different radial directions across the table 10 and is then returned to center, by cam means movable below the table 10. For this purpose, the thrust plate 15, which supports the die plate 14, is provided with four generally square openings 40 to 43, arranged in pairs with the openings of each pair diametrically opposite each other, and with the pairs at right angles to each other. Thus, as shown in Figs. 3 and 4, the pair of openings 40 and 41 lie opposite to each other on the 45° diameter extending diagonally from the right front of the machine to the left rear, and the pair of openings 42 and 43 lie opposite to each other on the 45° diameter extending diagonally from the left front to the right rear.

The radially outward walls of the square openings 40 to 43 form thrust-receiving faces 44—47 which are respectively perpendicular to radii from the center of the die plate 14, and are at right angles to each other. Each such face also serves as a guide during movements of the die plate parallel thereto. The faces 44—47 are respectively engaged by U-shaped shoes 50—53, which present broad surfaces in engagement therewith but which are shorter than such faces 44—47, to permit relative sliding longitudinal of the faces 44—47.

Bell-crank levers 54—57 are pivotally mounted below the table on horizontal axes respectively parallel to the thrust faces 44—47. Each bell crank lever 54—57 extends through an opening in the table 10 and has a toe embraced within one of the shoes 50—53, so that upward pivotal movement of a lever moves its associated shoe horizontally and radially outward against the opposing thrust-receiving face 44—47 of the thrust plate 15. Each lever has a heel which moves generally vertically during pivotal movement of the lever, and the lever heels are in operative engagement with cam bars 64 and 65 on a cam carrier 60, which is slidable longitudinally below the table 10.

The cam carrier 60 is slidably mounted on a horizontal support 61, which may be the upper surface of the frame member 29, rigid with the frame of the table 10, and is guided across such support 61 by longitudinal rails 62 slidably received in grooves in the longitudinal edges of the carrier 60. Sliding movement of the cam may be powered in any convenient way, conveniently by connecting it directly to the piston of a fluid operated cylinder 77 mounted below the table 10.

The four levers 44—57 are pivotally movable in two vertical planes at right angles to each other and at 45° with the center line of movement of the cam 60. In this arrangement, the levers are all equidistant from the center line of cam movement, and one lever of each pair of opposite levers lies on each side of such center line. The heels of the two levers 54 and 56, on the back side of such center line, ride on the cam bar 64 mounted along the longitudinal back edge of the cam carrier 60, and the heels of the two levers 55 and 57 ride on the cam bar 65 along the front edge of the carrier 60. As may be seen in Fig. 5, the cam bar 64 includes a long flat section 66 at its forward (left) end, then a low 67, then a rise 68, and then another long flat section 69 at the other end of the bar 64. The cam bar 65 includes a short flat section 70, a rise 71, a low 72, a central flat section 73, then a rise 74, a low 75, and a short flat end section 76. Conveniently, the faces are flat transversely. As shown in Fig. 7, the heels of the levers 54—57 extend transversely of the cam bars and hence diagonally with respect to the levers; and to take account of the relatively oblique movement of the levers, their heels are desirably rounded in planes transverse to the cam faces.

With the cam carrier 63 at the right-hand end of its stroke, as shown in Figs. 4 and 5, the heels of the cams 54—57 engage the cam bars 64 and 65 as indicated in Fig. 5, and movement of the cam through a stroke to the left operates the levers as follows:

First, the right rear lever 56 enters the low 67 and the left front lever 57 engages the rise 71. This raises the lever 57 to exert horizontal thrust on its shoes 53, while the cam 56 is lowered to permit the shoe 52 to retract, and the die plate 14 is moved diagonally forward and to the left. Meanwhile, the other pair of diametrically opposite levers 54 and 55 ride respectively on the flats 66 and 73 of the two cam bars, and hold their shoes 50 and 51 stationary to engage the faces 44 and 45 as guides, to limit the cam plate to linear movement parallel with the faces 44 and 45 and in the direction of the pair of levers 55 and 57. The lever 56 then engages the rise 68 while the lever 57 enters the low 72, which causes movement of the die plate in the opposite direction from its first movement, the levers 54 and 55 being still in engagement with the flats 66 and 73 so that their associated shoes guide the plate 14 for linear movement in that direction. The levers 56 and 57 which have moved now reach the flats 69 and 73, and the cam plate 14 is centered.

The left-rear lever 54 then enters the low 67 and the right front lever 55 engages the rise 74, to produce a movement of the die plate diagonally forward and to the right in the direction of the lever 55. Meanwhile, the levers 56 and 57 ride respectively on the flats 69 and 73 to hold their associated shoes stationary as guides for that movement. The levers 54 and 55 are then engaged by the cam elements 68 and 75 to cause a reverse movement of the plate 14 in the opposite direction. The levers 54 and 55 then finally reach the flats 69 and 76, and the die plate 14 is again entered.

The resulting movement of the die plate 14 is thus first successively in diametrically opposite directions along the diagonal thrust line of the levers 54 and 55. It is then centered, and is then moved successively in diametrically oposite directions along the diagonal thrust line of the levers 56 and 57 at right angles to the first movements.

Such sequence of die plate movements completes a full trimming cycle. Movement of the die carrier 63 in the reverse direction will likewise produce a similar sequence of movements of the die plate 14 for another full trimming cycle, but in the reverse order from that of the first stroke.

The cam carrier 63 may be reciprocated through its stroke by any desired source of power, conveniently a fluid operated cylinder 77.

Operation of the machine is as follows:

The upper die carrier is assumed to be in raised position, as shown in full lines in Fig. 1, so that the dies are open. A sheet metal stamping or work piece 32 is placed on the lower work holder 34 in proper relative position over the lower die 30. The power cylinder 23 is then operated to lower the upper-die carrier 20 to bring the upper die 31 downward toward shearing relationship with the lower die 30 and to bring the upper work-holder 36 into engagement with the upper surface of the work. This downward movement is stopped by engagement of the stop members 25 with the upper face of the table 10, when the dies are in proper operative relation.

The power cylinder 77 is now operated to move the cam carrier 63 through a full stroke. This causes successive radial movements of the die plate 14 across the table 10, as set forth above, to carry the lower die 30 through similar movements with respect to the stationary upper die 31. Such movements are first oppositely in the direction of one diagonal diameter of the die plate 14, then to center, then oppositely in the direction of the diagonal diameter at right angles with the first, and the plate 14 and die 30 are then returned to a centered position. This completes a full sequence of trimming operations. The upper die is now raised, by operation of the power cylinder 23. As the upper die 31 rises, the work 32 will normally remain within it and be carried upward with it. As the die carrier 20 approaches the upper limit of its travel, the knock-out bar 38 will engage the fixed cross member 39, and will stop further vertical movement of the upper work holder 36. Continued upward movement of the carrier 20 will carry the die 30 away from the work 32, and permit that work to drop out of the die 31.

The machine is now reloaded with another work piece 32, the power cylinder 33 operated to lower the upper die 31, and the power cylinder 77 operated to move the cam carrier 63 through a stroke in the opposite direction. Such opposite stroke produces a full productive sequence of radial movements of the lower die, in a reverse order from that occurring during the forward stroke.

The machine may be loaded and unloaded manually, and its two power cylinders 23 and 77 may be operated by manual controls. But the machine readily adapts itself to automatic loading and unloading, and whether the loading operations are manual or automatic, the power cylinders 23 and 77 may be operated by interlocking or automatic controls. Such cylinders may be operated hydraulically, or conveniently by compressed air, and may be replaced with other power mechanism as desired. The dies 30 and 31 are readily interchangeable with other pairs of dies, to trim a wide variety of stampings. Such dies may be either smaller than those shown, or may be larger, up to the limit of the area of the die plate. As desired, the die plate 14 itself may readily be removed, and without disturbing other operative parts of the machine. The dies used in the machine may be trimming dies, or dies which both trim and slit or punch edge portions of the work, and any such dies may be provided with means to do minor forming operations on the work, in accordance with known practice, but with substantially greater liberty than in prior machines. The machine is inherently quiet and smooth in operation, so that its parts and dies used with it are subjected to minimum wear.

I claim as my invention:

1. A machine for operating upon the walls of sheet-metal stampings, comprising a die-plate movable in its plane, a complementary die holder, a plurality of thrust-receiving faces normal to said die-plate and to radii from its center, a plurality of levers pivoted to move in planes containing said radii and normal to the plane of the die plate, said levers being in thrust-transmitting relation with said thrust-receiving faces, and cam means movable beneath said die plate for selective operation of said levers to thrust said die plate successively in radial directions.

2. A machine for operating upon the walls of sheet-metal stampings, comprising a die-plate movable in its plane, a complementary die holder, a plurality of thrust-receiving faces normal to said die-plate and to radii from its center, a plurality of levers pivoted to move in planes containing said radii and normal to the plane of the die plate, said levers being in thrust-transmitting relation with said thrust-receiving faces, and cam means movable beneath said die plate for selective operation of said levers to thrust said die plate successively in radial directions, said cam means being arranged so that during its thrust movement of one lever it causes other levers to guide said die plate for movement in the direction of thrust movement.

3. A machine for operating upon the walls of sheet-metal stampings, comprising a die-plate movable in its plane, a complementary die holder, a plurality of thrust-receiving faces normal to said die-plate and to radii from its center, a plurality of levers pivoted to move in planes containing said radii and normal to the plane of the die plate, said levers being in thrust-transmitting relation with said thrust-receiving faces, and cam means movable beneath said die plate for selective operation of said levers to thrust said die plate successively in radial directions, said levers being arranged in diametrically opposite pairs with the plane of each pair at right angles to the plane of another pair, said cam means being arranged so that during the movements of one pair of levers it holds the right-angle pair stationary in guiding relation with respect to its associated thrust receiving faces.

4. A machine for operating upon the walls of sheet-metal stampings, comprising a die-plate movable in its plane, two pairs of parallel thrust-receiving faces normal to said die plate and to planes at right angles to each other and to said die plate, two pairs of levers pivoted below said die plate to move in said planes against said thrust-receiving faces, and cam means to operate successively each pair of levers and simultaneously to hold the other pair stationary in guiding relationship with respect to its associated thrust-receiving faces.

5. The machine as defined in claim 1 in which the levers have toes movable generally horizontally against their thrust-receiving faces, and heels which move generally vertically, and in which the cam means is slidable parallel beneath the die plate in working relation with the heels of said levers.

6. The machine as defined in claim 4 in which the levers have toes movable generally horizontally against their thrust-receiving faces, and heels which move generally vertically, and in which the cam means is slidable parallel beneath the die plate in working relation with the heels of said levers.

7. The machine as defined in claim 4, in which the cam means are slidable parallel beneath the die plate and the planes of said levers are at 45° with the center line of cam movement, said cam means comprising a pair of cam bars each of which engages two of said levers.

8. A machine for operating upon the walls of sheet-metal stampings, comprising a die plate adapted to support a trimming die and movable in its plane, a complementary die holder, a plurality of levers pivoted beneath said die plate in operative relation therewith, and cam means beneath said die plate in operative relation with said levers and operable to move said levers to cause successive radial movements of said die plate in its plane.

9. A machine for operating upon the walls of sheet-metal stampings, comprising a die plate adapted to support a trimming die and movable in its plane, a complementary die holder, a plurality of levers pivoted beneath said die plate in operative relation therewith, and cam means beneath said die plate in operative relation with said levers and operable to move said levers to cause successive radial movements of said die plate in its plane, said levers being displaced from the axis of the die position on said plate, and a stationary work-holder support on said axis.

WM. O. HARTUP.

REFERENCES CITED

The following references are of record in the file of this patent:

UNITED STATES PATENTS

| Number | Name | Date |
|---|---|---|
| 2,125,269 | Buff | Aug. 2, 1938 |
| 2,320,272 | Friden | May 25, 1943 |